United States Patent
Gu et al.

(10) Patent No.: US 11,119,494 B2
(45) Date of Patent: Sep. 14, 2021

(54) USING MACHINE LEARNING TECHNIQUES TO ESTIMATE AVAILABLE ENERGY FOR VEHICLES

(71) Applicant: Wing Aviation LLC, Mountain View, CA (US)

(72) Inventors: Kaiwen Gu, Sunnyvale, CA (US); Matthew Nubbe, Sunnyvale, CA (US)

(73) Assignee: WING Aviation LLC, Mountain View, CA (US)

( * ) Notice: Subject to any disclaimer, the term of this patent is extended or adjusted under 35 U.S.C. 154(b) by 315 days.

(21) Appl. No.: 16/241,204

(22) Filed: Jan. 7, 2019

(65) Prior Publication Data

US 2020/0218270 A1 Jul. 9, 2020

(51) Int. Cl.
| | |
|---|---|
| *G05D 1/02* | (2020.01) |
| *B60L 58/12* | (2019.01) |
| *G06N 3/08* | (2006.01) |
| *G06N 20/00* | (2019.01) |
| *G05D 1/00* | (2006.01) |

(Continued)

(52) U.S. Cl.
CPC .......... *G05D 1/0217* (2013.01); *B60L 58/12* (2019.02); *G01C 21/3469* (2013.01); *G05D 1/0088* (2013.01); *G06N 3/08* (2013.01); *G06N 5/046* (2013.01); *G06N 20/00* (2019.01); *G05D 2201/0213* (2013.01)

(58) Field of Classification Search
CPC .............. G05D 1/0217; G05D 1/0088; G05D 2201/0213; G05D 1/0274; G05D 2201/0209; G05D 1/0225; G06N 20/00; G06N 3/0454; G06N 20/20; G06N 3/0472; G06N 7/005; G06N 3/08; G06N 5/046; G06N 3/088; G06N 3/006; G01C 21/3469; B60L 58/12; B60L 58/10; B60L 58/16; B60L 53/14

See application file for complete search history.

(56) References Cited

U.S. PATENT DOCUMENTS

| | | |
|---|---|---|
| 6,534,954 B1 | 3/2003 | Plett |
| 7,583,059 B2 | 9/2009 | Cho |

(Continued)

FOREIGN PATENT DOCUMENTS

WO 2009025512 2/2009

*Primary Examiner* — Luis A Martinez Borrero
(74) *Attorney, Agent, or Firm* — Christensen Johnson O'Connor Kindness PLLC

(57) ABSTRACT

Controlling a vehicle according to a trained neural network model capable of being used to generate an output from which one or more vehicle operating variables can be estimated. The neural network model can be used to process, as input, aggregated data corresponding to operational and/or environmental characteristics experienced by the vehicle during at least a portion of a voyage. The aggregated data can include a range of values collected over a period of time when the vehicle is traversing the portion of the voyage. The output generated by the neural network model, based on processing the input, can be further processed in order to determine, for example, an estimated state of charge and/or an estimated remaining flight time for the vehicle. Such estimated values can thereafter be used by a controller of the vehicle to maintain course or maneuver to a charging station.

19 Claims, 8 Drawing Sheets

(51) Int. Cl.
*G01C 21/34* (2006.01)
*G06N 5/04* (2006.01)

(56) References Cited

U.S. PATENT DOCUMENTS

| | | | | |
|---|---|---|---|---|
| 7,849,944 B2* | 12/2010 | DeVault | ................ | B60K 6/445 |
| | | | | 180/65.29 |
| 8,269,502 B2* | 9/2012 | Desprez | ............... | G01R 31/392 |
| | | | | 324/427 |
| 9,229,448 B1* | 1/2016 | Luther | ................... | G05D 1/00 |
| 9,256,225 B2* | 2/2016 | Downey | ................ | G07C 5/02 |
| 9,334,052 B2* | 5/2016 | Pasko | ................... | G06Q 10/00 |
| 10,042,359 B1* | 8/2018 | Konrardy | ............ | B60R 25/10 |
| 10,065,517 B1* | 9/2018 | Konrardy | ............ | G05D 1/0212 |
| 10,302,703 B2* | 5/2019 | Fleischer | ............. | G01R 31/389 |
| 10,324,463 B1* | 6/2019 | Konrardy | ...... | G01C 21/3407 |
| 10,366,549 B1* | 7/2019 | Mash | .................... | B60L 3/04 |
| 10,545,500 B2* | 1/2020 | Schubert | ............... | G06N 3/04 |
| 10,621,448 B2* | 4/2020 | Schubert | ............ | B60K 31/0008 |
| 10,778,024 B2* | 9/2020 | Gu | ........................ | H02J 7/0065 |
| 10,781,763 B2* | 9/2020 | Pati | ...................... | F02D 41/1406 |
| 10,810,501 B1* | 10/2020 | Kimchi | ................ | B64C 39/024 |
| 10,883,844 B2* | 1/2021 | Ogale | ................... | G06N 3/0454 |
| 10,891,868 B1* | 1/2021 | Parodi | ................... | G08G 5/0039 |
| 10,893,107 B1* | 1/2021 | Callari | ................... | H04L 67/34 |
| 10,894,601 B2* | 1/2021 | Blake | ....................... | H02J 7/00 |
| 2008/0249667 A1 | 10/2008 | Horvitz et al. | | |
| 2009/0114463 A1* | 5/2009 | DeVault | ............... | B60W 10/26 |
| | | | | 180/65.29 |
| 2009/0259363 A1* | 10/2009 | Li | ..................... | B60W 50/0097 |
| | | | | 701/36 |
| 2012/0179311 A1* | 7/2012 | Skaff | ...................... | B60L 58/12 |
| | | | | 701/22 |
| 2014/0236467 A1* | 8/2014 | Liu | ......................... | B60L 1/003 |
| | | | | 701/123 |
| 2015/0239460 A1* | 8/2015 | Manickaraj | .......... | B60W 20/12 |
| | | | | 701/22 |
| 2015/0323930 A1* | 11/2015 | Downey | .............. | G08G 5/0026 |
| | | | | 701/2 |
| 2015/0336668 A1* | 11/2015 | Pasko | ................... | B64C 39/024 |
| | | | | 701/2 |
| 2016/0075333 A1* | 3/2016 | Sujan | .................... | B60W 10/02 |
| | | | | 701/25 |
| 2017/0088119 A1* | 3/2017 | Zhang | ................... | B60W 50/00 |
| 2018/0196107 A1* | 7/2018 | Fleischer | ............... | G01R 31/52 |
| 2018/0292817 A1* | 10/2018 | Yang | ...................... | G08G 5/0043 |
| 2018/0313282 A1* | 11/2018 | Pati | ....................... | G05D 1/0217 |
| 2018/0364740 A1* | 12/2018 | Collins | ................ | G05D 1/0684 |
| 2019/0011934 A1* | 1/2019 | DeBitetto | ........ | G05D 1/106 |
| 2019/0041852 A1* | 2/2019 | Schubert | ............. | G05D 1/0044 |
| 2019/0042859 A1* | 2/2019 | Schubert | ................ | G05D 1/00 |
| 2019/0271563 A1* | 9/2019 | Pandit | ................... | G01C 21/20 |
| 2019/0315482 A1* | 10/2019 | Gu | ........................ | G05D 1/104 |
| 2019/0325763 A1* | 10/2019 | Hux | ...................... | A63F 13/5255 |
| 2020/0065679 A1* | 2/2020 | Javeri | ................ | G01C 21/3469 |
| 2020/0086987 A1* | 3/2020 | Schmalzried | ......... | B65G 1/1373 |
| 2020/0108732 A1* | 4/2020 | Northrop | ............. | G06N 3/088 |
| 2020/0164763 A1* | 5/2020 | Holme | ................ | B60L 58/10 |

* cited by examiner

USING MACHINE LEARNING TECHNIQUES TO ESTIMATE AVAILABLE ENERGY FOR VEHICLES

BACKGROUND

Autonomous and semi-autonomous vehicles typically operate using exhaustible fuel sources that can often require the vehicles to frequently refuel over relatively brief periods of operation. As a result, delays in particular voyages can occur, thereby resulting in a recipient of a payload, carried by a particular vehicle, to not receive the payload at an expected time. This can be especially concerning when the payload is being provided to fulfill an emergency service available by an entity that has employed the vehicle to deliver the payload.

Although a respective entity can attempt to preemptively schedule refueling stops for a vehicle that is tasked with completing a voyage, oftentimes such predictions do not consider environmental conditions that can affect vehicle performance along a voyage. For instance, an internal resistance of a battery can be negatively affected by cold temperatures, resulting in the battery appearing to have a lower charge capacity. Many subsystems of a vehicle can depend on an apparent charge capacity of a battery to be above a particular threshold. Therefore, the inability to reliably predict apparent changes to such battery characteristics, and the effects they have on the subsystems of a vehicle, can result in loss of function and/or damage to the vehicle, depending on a circumstance in which a function is lost (e.g., an inability to no longer hover can cause an unmanned aerial vehicle (UAV) to crash land). Furthermore, environmental conditions, such as wind speed and direction, can cause operational characteristics of the subsystems of the vehicle to change, at least in order to compensate for such conditions (e.g., maintaining trajectory during a headwind). As a result, an amount of current and/or voltage provided by the battery may not be accurately calculable by an entity that is preemptively planning the voyage of the vehicle, thereby increasing a risk that the vehicle may lose functionality in response to a loss of available charge.

SUMMARY

This disclosure is generally directed to systems, methods, and apparatuses for determining estimates of available battery power for a particular device using one or more machine learning models, such as one or more neural network models. The machine learning models can be trained using characteristic data corresponding to instantaneous and/or historical characteristic values associated with operational and/or environmental related characteristics of a vehicle during a voyage. For instance, the particular device can be a battery operated vehicle, such as an unmanned aerial vehicle (UAV), an automobile (e.g., autonomous and/or manual driven), and/or any other vehicle capable of traveling to a particular destination.

In some implementations, data collected before, during, and/or after one or more voyages of one or more vehicles can be used as training data for one or more machine learning models. For example, the training data can be used to train a recurrent neural network ("RNN") model. An RNN model can be a neural network model that includes one or more one memory layers that each include one or more memory units. In some implementations, a memory unit can be a long short-term (LSTM) LSTM unit, a gated recurrent unit ("GRU") and/or other memory unit(s). Input can be sequentially applied to an RNN and, at each iteration of applied input, the memory unit(s) can be utilized to calculate a new hidden state based on the input of that iteration and based on a current hidden state, where the current hidden state can be based on input(s) of prior iteration(s). In other words, the memory unit(s) can selectively retain memory of prior iteration(s) to enable processing of current iterations to be influenced by the prior iteration(s). In this manner, RNN models can, in making a prediction at a current iteration, take into account at least some information that was processed during a previous iteration. This allows an RNN model to be especially proficient at sequence recognition and/or temporal prediction. According to some implementations disclosed herein, a vehicle can employ an RNN model in order to estimate a state of charge of a battery of the vehicle. The RNN model can be trained using data from one or more complete and/or partial voyages of one or more vehicles. For example, the RNN model can be trained using data collected from at least one vehicle that completed at least one voyage with a starting state of charge of 90% and a final state of charge of 72%. Data collected during the aforementioned voyage can include the aforementioned states of charge, instantaneous current output, instantaneous voltage drop, instantaneous power consumption, operating temperature, environmental temperature, wind speed and/or direction, and/or any other data that can be relevant to a voyage of a vehicle. Subsequently, the same type of data can be collected during a voyage of a vehicle, and the collected data can be sequentially processed using the trained RNN model at each of a plurality of iterations. The processing of the data using the RNN model can provide, at each iteration of processing, a corresponding real time estimate of state of charge, and the real time estimates of state of charge can be utilized during the voyage for various purposes. In this way, as the state of charge is estimated and dynamically declining during the voyage, the estimates of state of charge will be used as data from which subsequent state of charge estimates can be derived. Such estimates can be used by a vehicle in order to alter a trajectory of the vehicle, modify a route of the vehicle, abandon a voyage of the vehicle (e.g., return to a starting point or land somewhere nearby), identify a place to recharge, and/or make any other decision regarding controlling a vehicle. A trajectory of a vehicle can be, for example, a route of the vehicle (e.g., a series of target waypoints) and optionally one or more target velocities, target accelerations, etc. along the route.

In additional, or alternative implementations, the training data can be used to train a feed forward neural network model. A feed forward neural network model can be a neural network without memory layer(s), and therefore can be utilized to generate, at each iteration, a predicted output based on current input being processed, and without regard to prior input(s) that were processed (although prior output(s) could optionally be processed as input in a given iteration). For example, a vehicle can employ a feed forward neural network model in order to estimate a remaining amount of operating time for the vehicle. Operating time can refer to a flight time, a drive time, and/or any other value that can quantify an amount of time that is left before a vehicle needs to refuel or recharge before continuing a current or subsequent voyage. For example, a feed forward neural network model can be trained using data from one or more voyages of one or more vehicles. The training data that is collected can include flight time, instantaneous state of charge, instantaneous battery temperature, instantaneous power consumption, and/or any other vehicle related data. The trained feed forward neural network model can be employed during subsequent voyages of a vehicle. For example, during a subsequent voyage of a vehicle, the feed forward neural network model can be utilized to process, in real time, values such as current flight time, current state of charge, current battery temperature, and/or current power consumption. The output generated based on the processing, using the feed forward neural network model, can be an estimated remaining flight time, or one or more values from which an estimated remaining flight time can be derived. The estimated remaining flight time can be generated at any instant before, during, and/or after a voyage of a vehicle, in order to determine whether to refuel or recharge during a voyage, or continue to a particular destination on the voyage. In some implementations, the output generated based on the processing can include battery cell impedance, fuel source health, instantaneous energy, computational bandwidth and/or capacity, network bandwidth, energy storage remaining (e.g., 30 kilowatt hours), an amount of flight time remaining (e.g., 23 minutes), an amount of hover time remaining, and/or other parameter(s) that can be suitable for making vehicle-related decisions during travel.

In some implementations, training data can include one or more statistical characteristics of previous voyages that are based on data collected during one or more previous voyages of one or more vehicles. For example, an average current and/or voltage drop of one or more batteries during a previous voyage can be used as training data input, along with corresponding labeled training data output (e.g., labeled remaining operating time, state of charge, and/or other metric), to train a feed forward neural network model to estimate remaining operating time, state of charge, and/or any other metric that can be associated with operating a vehicle. Alternatively, or additionally, any statistical characteristic(s) of data, such as mode or a maximum for a particular set of data, can be used as training data input, along with corresponding labeled training data output, to train a feed forward neural network model to estimate remaining operating time, state of charge, and/or any other metric that can be associated with operating a vehicle. In this way, a feed forward neural network model employed by a vehicle can rely on one or more ranges of data collected during one or more voyages of one or more vehicles.

The data collected for training one or more neural network models can be characteristic data associated with one or more vehicles, and contextual data collected during one or more voyages of the one or more vehicles. The training data can be collected from a vehicle prior to the vehicle beginning the voyage, during the voyage of the vehicle, and/or at or after completion of the voyage. For instance, prior to the vehicle beginning a voyage, the vehicle can be docked at a charging station, at which a battery array of the vehicle can receive a charge. The charging station can be equipped with one or more sensors capable of detecting various conditions of the vehicle and/or the battery array. For example, the charging station can charge one or more batteries at the vehicle intermittently, in order that impedance of the one or more batteries can be measured when charging is paused or otherwise not occurring. For instance, a signal such as a square wave, sine wave, and/or any other signal, can be provided to the battery in order to draw a measurable or suitable response from the battery. The response can then be processed at the charging station or a remote device in order to determine an impedance of one or more batteries of the vehicle prior to beginning a voyage. Alternatively, or additionally, the charging station can include one or more sensors for collecting data about an environment of the vehicle at the beginning of a voyage, or at any other point during a particular voyage. The environmental sensors can generate data associated with an elevation of the charging station, wind speed at or near the charging station, a temperature at or near the charging station, a humidity and/or moisture level at the charging station, a geographical location of the charging station, a particular time at which the vehicle arrived at and/or departed from the charging station, and/or any other environmental variables that can be associated with a charging station.

In some implementations, conditions of the vehicle and/or environmental conditions that are exhibited during a voyage of the vehicle can be measured during the voyage of the vehicle. For example, the vehicle can include one or more sensors capable of measuring various conditions experienced by the vehicle during the voyage. Such environmental conditions can include elevation and/or changes in elevation, velocity, acceleration, wind speed, wind direction, temperature, humidity, precipitation, distance traveled, changes in angle and/or trajectory, types of weather experienced during the voyage, and/or any other environmental data that can be collected during a voyage of a vehicle. It should be noted that the environmental data can be collected at the vehicle and/or at one or more remote locations capable of collecting data about an environment of the vehicle during the voyage. In some implementations, a vehicle can include one or more sensors capable of measuring particular operating conditions of the vehicle during the voyage. Such operating conditions can include temperature of one or more different components of the vehicle, battery chemistry, battery temperature, state of charge of one or more batteries, changes in voltage such as voltage drop of one or more batteries, impedance, current consumption of one or more components of the vehicle, motor speed(s), velocity, acceleration, load on a battery, weight and/or changes in weight of the vehicle, power consumption of the vehicle, bit rate of particular computational operations during the voyage, and/or any other variable or statistical characteristic (e.g., average) of a variable that can be measured during a voyage of a vehicle.

In some implementations, conditions of the vehicle and/or environmental conditions can be measured at the end of a voyage of the vehicle. For example, the vehicle can include one or more sensors capable of measuring conditions experienced by the vehicle as a result of completing a voyage. Furthermore, any collected data can be aggregated and processed in order to generate statistical characteristics from the data. For instance, data generated before, during, and/or at the end of a voyage can include averages, maximum, minimum, ranges, variances, mode, weighted average, standard deviation, and/or any other statistical component that can be generated from any of the measured variables or data discussed here in. For example, a statistical characteristic can include a ratio of measured data collected during one or more voyages of one or more vehicles. When a vehicle has completed a voyage, particular measurements can be collected from one or more sensors of the vehicle and/or a location at which the vehicle ended the voyage. For instance, some data measured at the end of a voyage can include completion time, operating temperature at the end of the voyage, state of charge at the end of the voyage, impedance, voltage, weight, and/or any other variable or data that can be collected from a vehicle that has completed a route or voyage.

The above description is provided as an overview of some implementations of the present disclosure. Further description of those implementations, and other implementations, are described in more detail below.

In some implementations, a method implemented by one or more processors is set forth as including operations such as receiving operational data corresponding to vehicle operations, which include a vehicle navigating to complete a voyage by at least passing between two different locations. The method can further include applying the operational data to a neural network model that has been previously trained using past operational data collected during one or more voyages of one or more vehicles. For example, the past operational data can include data collected during other voyages of multiple other vehicles that include one or more different parts relative to the vehicle. The other vehicles can, for example, include one or more different batteries from a battery of the vehicle, and the operational data can be based at least on the battery that is in the vehicle. Therefore, despite at least one other vehicle having a different battery, the neural network model would be trained according to operations of a variety of different vehicles, rather than just those vehicles that have the same battery as the vehicle. The method can further include generating, based on an output of the neural network model, an estimated value corresponding to an operating variable of the vehicle, wherein an ability of the vehicle to complete the voyage is at least partially conditioned upon the operating variable. The method can also include determining a voyage completion estimate based on the estimated value for the operating variable of the vehicle and a current status of the vehicle through the voyage. Furthermore, the method can include, when the voyage completion estimate indicates that the operating variable of the vehicle is insufficient for completing the voyage: causing the vehicle to maneuver to a separate location between the two different locations at which the vehicle can stop.

In some implementations, a method implemented by one or more processors is set forth as including operations such as receiving operational data corresponding to vehicle operations, which include a vehicle navigating to complete a voyage by at least passing between two different locations. The operations can further include receiving environmental data associated with environmental conditions in which the vehicle is operating while passing between the two different locations. The operations can further include processing the operational data and the environmental data using a neural network model that has been previously trained using past operational data and past environmental data collected during one or more voyages of one or more vehicles. The operations can further include generating, as output of the neural network model based on the processing, an estimated value corresponding to an operating variable of the vehicle, wherein an ability of the vehicle to complete the voyage is at least partially conditioned upon the operating variable. The operations can further include determining a voyage completion estimate based on the estimated value for the operating variable of the vehicle and a current status of the vehicle through the voyage. The operations can further include, when the voyage completion estimate indicates that the operating variable of the vehicle is insufficient for completing the voyage, causing the vehicle to maneuver to a separate location, between the two different locations.

In some implementations, the vehicle is powered via one or more refuelable energy sources, and the operational data corresponds to one or more measured operating characteristics of the one or more refuelable energy sources. In some implementations, the neural network model is a recurrent neural network model that includes at least one memory layer, and wherein the operating variable is based on one or more of an estimated flight time, remaining flight time, battery energy, remaining battery energy, remaining distance, and/or remaining hover time. In some implementations, the vehicle is an unmanned aerial vehicle (UAV), an autonomous vehicle, non-autonomous vehicle, and/or a semi-autonomous vehicle; and causing the vehicle to maneuver to the separate location between the two different locations includes: determining that a charging station, at the separate location, exists near a current location of the vehicle, and determining that an estimated travel time between the current location at the separate location is less than or equal to the estimated remaining flight time. In some implementations, the neural network model is a feedforward neural network model and the operating variable is a state of charge of the one or more batteries of the vehicle. In some implementations, the vehicle includes one or more sensors and the operational data includes a statistical characteristic of at least a portion of sensor data from the one or more sensors. In some implementations, the statistical characteristic includes an average, a mode, a minimum, or a maximum of the portion of the sensor data.

In other implementations, a method implemented by one or more processors is set forth as including operations such as determining a transient characteristic value corresponding to a dynamic property of an energy storage apparatus accessible to a vehicle, wherein the dynamic property is measured during a refueling of the vehicle, the refueling of the vehicle being immediately prior to, or along, a voyage of the vehicle. The operations can further include determining, during the voyage of the vehicle, a range of operational characteristic values associated with the vehicle, wherein the range of operational characteristic values correspond to historical operational characteristics measured during at least a time period during the voyage. The operations can further include processing, as input to a trained neural network model, the transient characteristic value and the range of operational characteristic values associated with the vehicle, wherein the trained neural network model is trained based on data obtained during previous voyages of one or more vehicles. The operations can further include generating, as output from the trained neural network model and based on the processing, an estimated value corresponding to an operating variable of the vehicle, wherein an ability of the vehicle to complete a portion of the voyage is at least partially conditioned upon the operating variable. The operations can further include causing the vehicle to maneuver according to a trajectory that is selected based on the estimated value and in furtherance of the vehicle completing the voyage.

In some implementations, the energy storage apparatus includes one or more batteries and the method further comprises: receiving, from a remote computing device that is connected to an environmental sensor, environmental data corresponding to an environmental condition affecting a battery of the vehicle during the voyage, wherein the input to the trained neural network model further includes an environmental characteristic value that is based on the environmental data. In some implementations, the historical operational characteristics are measured by one or more sensors of vehicle during the voyage of the vehicle. In some implementations, the refueling of the vehicle is performed at a location that includes a charging station configured to measure the dynamic property or along the voyage via a charging apparatus configured to measure the dynamic property. In some implementations, the dynamic property includes an impedance value of the energy storage apparatus of the vehicle, and each charging station is configured to intermittently charge the energy storage apparatus and measure the impedance value of the energy storage apparatus during a respective refueling.

In yet other implementations, a method implemented by one or more processors is set forth as including operations such as generating a first range of operational characteristic values associated with a vehicle that is operating to complete a voyage, wherein the first range of operational characteristic values correspond to historical operational characteristics measured during a first portion of the voyage of the vehicle. In some implementations, the operations can include generating a first present characteristic value corresponding to a first present operational characteristic of the vehicle, wherein the historical operational characteristics and the first present operational characteristic convey different operating characteristics of the vehicle. In some implementations, the operations can further include processing, as a first input to a trained neural network model, the first range of operational characteristic values and the first present characteristic value. In some implementations, the operations can further include generating, as a first output from the trained neural network model and based on the processing, a first estimated value corresponding to an operating variable of the vehicle, wherein an ability of the vehicle to complete a portion of the voyage is at least partially conditioned upon the operating variable. In some implementations, the operations can further include determining a second range of operational characteristic values corresponding to other historical operational characteristics measured during a second portion of the voyage of the vehicle that is sequentially later in the voyage relative to the first portion of the voyage. The some implementations, the operations can further include determining a second present characteristic value corresponding to a second present operational characteristic of the vehicle, wherein the second present operational characteristic is exhibited by the vehicle subsequent to the vehicle exhibiting the first present operational characteristic. In some implementations, the operations can further include providing, as a second input to the trained neural network model, the second range of operational characteristic values and the second present characteristic value, wherein the trained neural network model is a recurrent neural network model that stores the first output for processing with the second input to determine a second output. In some implementations, the operations can further include receiving the second output from the trained neural network model, wherein the second output includes a second estimated value corresponding to the operating variable of the vehicle. In some implementations, the operations can further include causing the vehicle to maneuver in furtherance of completing the voyage based on the second estimated value corresponding to the operating variable of the vehicle.

In some implementations, the operating variable indicates an amount of energy storage available at the vehicle. In some implementations, causing the vehicle to maneuver in furtherance of completing the voyage based on the second estimated value includes: when the amount of energy storage available at the vehicle is indicated to be sufficient for completing the voyage without refueling: causing the vehicle to maneuver to a destination that is designated as a final destination of the vehicle for the voyage. In some implementations, causing the vehicle to maneuver in furtherance of completing the voyage based on the second estimated value includes: when the amount of energy storage available at the vehicle is indicated as being insufficient for completing the voyage without refueling: causing the vehicle to maneuver to a refueling location for refueling the vehicle prior to arriving at a final destination of the vehicle for the voyage. In some implementations, the amount of energy storage corresponds to one or more batteries of a type of battery attached to the vehicle, and the trained neural network model is trained using data from one or more vehicles that include the type of battery. In some implementations, the operating variable is a state of charge of one or more power supplies configured to provide power to the vehicle, and the first range of operational characteristic values is generated based on environmental measurements performed by the vehicle during the first portion of the voyage. In some implementations, the different operating characteristics of the vehicle include one or more electrical characteristics selected from a list that includes: a present voltage drop, a present current output, an average current output for the journey, or a maximum current output exhibited during the voyage. In some implementations, the operating variable corresponds to one or more status characteristics selected from another list that includes: a state of charge or a state of energy. In some implementations, a time period corresponding to the second range of values at least partially overlaps with another time period corresponding to the first range of values.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
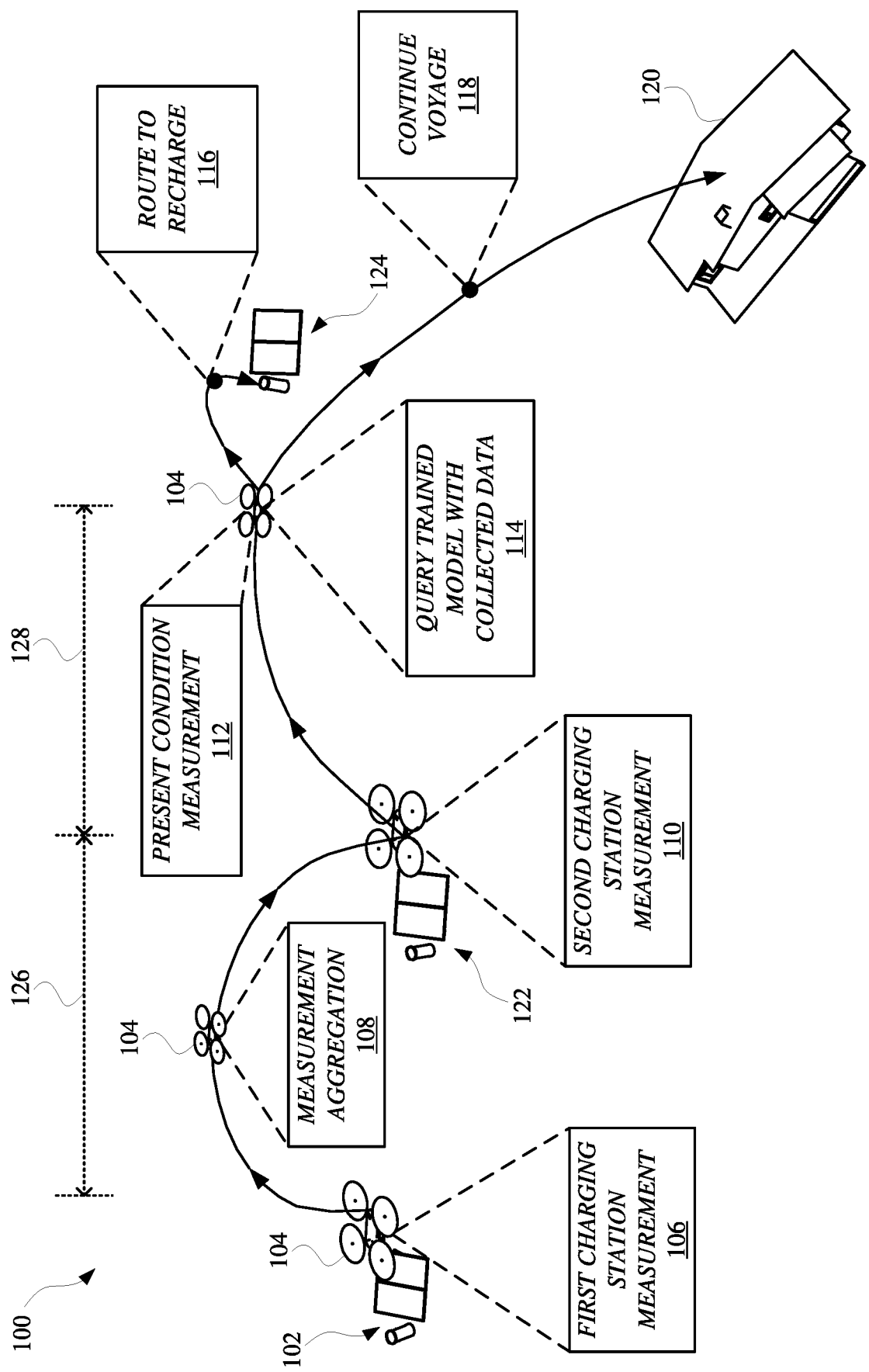
FIG. 1 illustrates a diagram of a vehicle traversing different portions of a voyage while simultaneously collecting aggregate data, which can be used as an input to a neural network model in order to receive an output from which to make operational decisions during the voyage.

FIG. 1 illustrates a diagram 100 of a vehicle traversing different portions of a voyage while simultaneously collecting aggregate data, which can be processed using a machine learning model (e.g., a neural network model) in order to generate output from which to make operational decisions during the voyage. Specifically, the diagram 100 illustrates a vehicle 104 traversing multiple portions of a voyage in order to arrive at a particular location 120. For example, the vehicle 104 can be an electrically powered vehicle, which can have one or more batteries capable of recharging at different charging stations. In order to ensure that the vehicle 104 does not run out of charge in the middle of a flight, one or more sensors located at the vehicle and/or remotely from the vehicle can collect data corresponding to operational conditions and/or environmental conditions being experienced by the vehicle 104. Initially, at a first portion 126 of the voyage, the vehicle 104 can be located at a first charging station 102. At the first charging station 102, a first charging station measurement 106 can be conducted. For example, the first charging station 102 can be equipped with a system for measuring one or more operating conditions of the vehicle, such as an impedance of the battery, a temperature of the vehicle and/or battery, a resistance of one or more components of the vehicle, a weight of the vehicle, and/or any other condition that can be related to the operation of a vehicle. Thereafter, the vehicle 104 can proceed from the first charging station 102 to a second charging station 122. While traversing the first portion 126 of the voyage, between the first charging station 102 and the second charging station 122, the vehicle 104 can perform a measurement aggregation 108. The measurement aggregation 108 can be an operation of compiling data related to conditions experienced by the vehicle 104 during the first portion 126 of the voyage. Aggregate data generated during the first portion 126 of the voyage can include samples of temperature, voltage drop, current, peak power, peak current, samples of wind speed and/or wind direction, elevation measurements, and/or any other data that can be related to vehicle performance.

When the vehicle 104 arrives at the second charging station, a second charging station measurement 110 can be performed. The second charging station 122 can also be equipped with a system for measuring one or more operating conditions of the vehicle. For instance, the second charging station 122 can be equipped with a system that can intermittently charge the vehicle 104 and take certain measurements between periods of charging. For example, in some implementations a characteristic value of one or more components of the vehicle 104 can be measured by, supplying a signal to the one or more components, and measuring a resulting signal or feedback provided by the one or more components in response to receiving the signal. Such a process can be employed when measuring an impedance of the battery during breaks between charging of the battery by a charging station.

When the vehicle 104 has received a suitable amount of charge for the particular voyage, the vehicle 104 can continue through a second portion 128 of the voyage. During the second portion 128 of the voyage, a present condition measurement 112 of the vehicle 104 can be performed. The present condition measurement 112 can be an instantaneous measurement of a particular operating condition of the vehicle 104. For example, the present condition measurement 112 can correspond to a present environmental condition influencing the vehicle 104 and/or a present operational condition influencing the vehicle 104. In some implementations, data collected at the measurement aggregation 108 can be different from a type of data corresponding to the present condition measurement 112. Furthermore, it should be noted that measurement aggregation and/or present condition measurements can be performed one or more times during each portion of a voyage. In this way, ranges of data will be associated with the vehicle during different portions of the voyage, as well as instantaneous data measurements.

During the second portion 128 of the voyage, the vehicle 104, or a computing device associated with the vehicle 104, can query that trained model with the collected data 114. The collected data, provided as input to the trained neural network model, can include a range of values collected over time and corresponding to a particular operating condition (e.g., velocity or voltage drop) and/or environmental condition (e.g., temperature values). The collected data provided as input to a neural network model can also include instantaneous data, collected close to a time when the input is being provided to the neural network model. For example, an elevation, a temperature, and/or a progress of the vehicle 104 through the voyage can be provided as input with one or more ranges of data to the neural network model.

The input can be processed using the neural network model to generate an output, which can be used to generate an estimated value for an operating variable of the vehicle 104. For example, the neural network model can provide an output, which is then provided to a separate function and/or module for estimating a state of charge and/or a state of energy of a power source for the vehicle 104. Alternatively, or additionally, the output of a neural network model can be an estimated value for the operating variable of the vehicle. Alternatively, or additionally, the output of the neural network model can be used to generate multiple different estimates corresponding to multiple different operating variables, respectively. For example, an output of the neural network model can be used to generate an estimated value for a state of charge of a battery of the vehicle 104 and/or a remaining estimated voyage time for the vehicle 104. In some implementations, the remaining estimated voyage time can be an estimated time until the power source for the vehicle 104 is no longer able to cause the vehicle 104 to perform one or more voyage functions (e.g., the power source is no longer able to provide sufficient power to one or more components). In some implementations, the remaining estimated voyage time can be an estimated time until the power source for the vehicle 104 is within a threshold of no longer being able to cause the vehicle 104 to perform one or more voyage functions (e.g., the threshold can be a "safety threshold" so that the "remaining estimated voyage time" is with respect to a time threshold before (e.g., 30 seconds before, 1 minute before, etc.) a time at which the power source will truly no longer be able to provide sufficient power.

Depending on the output generated using the neural network model, the vehicle 104 can be caused to perform an operation such as reroute to recharge 116, or continue the voyage 118 to a particular location 120. For example, a determined state of charge can be further processed in combination with additional information about the voyage, such as a remaining distance and/or a geographic location of the final location 120 for the voyage, in order to determine how to maneuver the vehicle 104. When an estimated value for the state of charge indicates that the vehicle 104 does not have enough fuel to travel to the location 120 without recharging, the vehicle 104 can perform an operation of routing to recharge 116. For instance, the vehicle 104 can route to charging at a third charging station 124 in order to receive a suitable amount of charge for completing the voyage. However, should the estimated value for the state of charge indicate that the vehicle can proceed to the final location for the voyage, the vehicle can be caused to perform an operation of continuing the voyage 104, in order to arrive at the location 120.

In some implementations, the output generated using the neural network model can indicate that the vehicle 104 has more charge than necessary to reach the location 120. In some of those implementations, in response to generating such output using the trained neural network model, the vehicle 104 can be caused to change its operating parameters to leverage the extra charge to enable more expedient completing of the voyage. For instance, the vehicle 104 can be caused to accelerate and/or increase its velocity to a higher cruising velocity in order to reach the location 120 more quickly. Alternatively, or additionally, a decision to adjust operating parameters in order to reduce travel time to the location 120 can be influenced by whether the vehicle 104 has one or more pending tasks to reach one or more other locations. For example, if the vehicle 104 is tasked with maneuvering to another location after the location 120, and the vehicle 104 has an abundance of or extra stored charge, the vehicle 104 can elect to not change operating parameters in order to preserve the abundance of charge for reaching the other location. In some implementations, the output generated using the neural network model can indicate that the vehicle 104 has insufficient charge to reach the location 120 if it continues upon its current trajectory, but that the vehicle has sufficient charge to reach the location 120 if it alters its current trajectory. In some of those implementations, the vehicle 104 can be caused to alter its trajectory to ensure that it reaches the location 120. For example, the vehicle 104 can be caused to decelerate and/or otherwise alter its trajectory to enable it to reach the location 120 in a more energy efficient manner, even though the more energy efficient manner may cause a temporal delay in the arrival of the vehicle 104 at the location 120.

Figure 2:
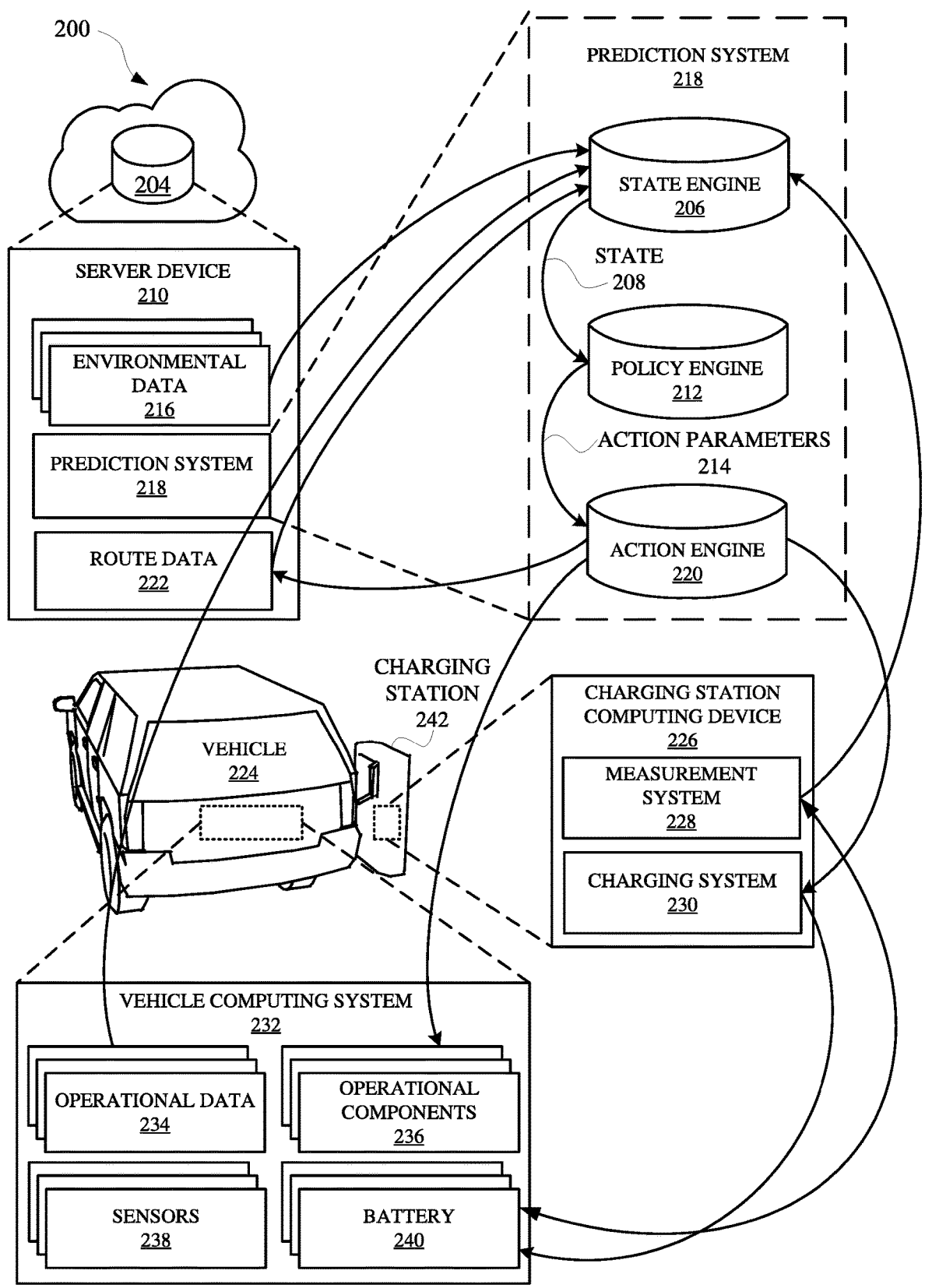
FIG. 2 illustrates a system for employing a neural network model for estimating one or more values associated with operations of a vehicle that is maneuvering to complete a voyage.

FIG. 2 illustrates a system 200 for employing a prediction system 218 for estimating one or more values associated with operations of a vehicle 224 that is maneuvering to complete a voyage. For example, the vehicle 224 can be configured to carry one or more passengers to a final location, while necessitating multiple charges between a starting location for the voyage and a final destination for the voyage. In order to ensure that the passengers are not left in a remote location as a result of a loss of charge, the vehicle 224 can include a vehicle computing system 232 capable of interacting with the prediction system 218. The neural network model 218 can be trained to provide one or more outputs from which accurate estimates of operating variables, such as, but not limited to, a state of charge of a battery 240, a state of energy of the vehicle 224, and/or a remaining flight time of the vehicle 224 can be determined.

The system 200 can include a vehicle 224, which can be any type of vehicle such as an automobile, UAV, drone, and/or any other vehicle capable of traversing land, water, air, and/or space. The vehicle 224 can include a vehicle computing system 232 capable of collecting operational data 234 before, during, and/or after a voyage of the vehicle 224. The operational data 234 can include instantaneous data that is collected, for purposes of being provided as an input to the neural network model 218, at a time that is relatively close or substantially the same as the time the instantaneous data is provided to the neural network model 218. For example, instantaneous data can include a battery temperature measurement that is based on a sensor output of a battery temperature sensor (i.e., one of multiple sensors 238). The operational data 234 can also include ranges of data collected over one or more periods of time before, during, and/or after a voyage of the vehicle 224. For example, one or more sensors 238 can measure characteristics such as, but not limited to, current, temperature, voltage, power, impedance, and/or resistance of any operational component 236 of the vehicle 224, and/or measure acceleration, velocity, weight, moisture, wind speed, direction, and/or any other characteristic of the vehicle 224. Such characteristic values can be measured over a period of time in order to compile of a range of values that can be simultaneously or sequentially provided as input to the neural network model 218.

The vehicle 224 can operate according to one or more operational components 236, which can include one or more processors and/or one or more memory device, as well as an energy source such as a battery 240. The battery 240 can include one or more cells of the same or different battery chemistries. Each cell of the battery 240 can be monitored individually by one or more sensors 238, and/or all cells can be monitored in aggregate by one or more sensors 238. In some implementations, the operational components 236 can include a motor, one or more computers, various subsystems of the vehicle such as air conditioning, brakes, global positioning system (GPS) navigation, power steering, power management, coolant flow, and/or any other apparatus or module that can be connected to a vehicle.

In some implementations, the system 200 can include a remote computing device 204, such as a server device 210, which can employ the neural network model 218. However, in some implementations, the neural network model 218 can be provided at the vehicle computing system 232. In other implementations, the neural network model 218 can be split across multiple computing devices, which can include the server device 210, the vehicle computing system 232, and/or a charging station computing device 226. While the vehicle is maneuvering to complete a voyage, the vehicle 224 and/or the remote computing device 204 can collect environmental data 216 corresponding to environmental conditions experienced by the vehicle 224. The environmental data 216 can be based on sensor output(s) and/or computing device output(s) from one or more different sources, such a weather service, a cellular device, the vehicle 224, one or more other vehicles, satellites, broadcast apparatuses, and/or any other device capable of providing environment-related data. In some implementations, the server device 210 can manage route data 222 for the vehicle 224, thereby allowing the server device 210 to change a route of the vehicle 224 during a voyage. Alternatively, or additionally, the route data 222 can be stored at the vehicle computing system 232. Furthermore, the server device 210 can include a neural network model 218 capable of processing, as input, the environmental data 216, the operational data 234, measurement data from a measurement system 228 of a charging station 242, route data 222, and/or any other data and/or range of data that can be associated with a vehicle.

The prediction system 218 can be configured to process input data and generate, based on the processing, an output from which one or more values for one or more operating variables can be estimated. The prediction system 218 can be trained according to data collected during previous voyages of the vehicle 224, one or more different vehicles, one or more vehicles with the same or different batteries as the vehicle 224, and/or complete and/or partial voyages of the vehicle 224 and/or other vehicles. The prediction system 218 can include a state engine 206 capable of receiving inputs from which to generate a state 208 of the vehicle 224. For example, the state engine 206 can receive, as input, one or more of environmental data 216, route data 222, operational data 234, measurement data from the measurement system 228, and/or any other data that can indicate a state of the vehicle 224. Furthermore, inputs to the state engine 206 can include instantaneous data, ranges of data, and/or a combination thereof (e.g., an input can include instantaneous battery temperature data and a range of current values corresponding to current measurements from the battery 240 over a period of time). In this way, the state engine 206 can generate a state 208 from an input that includes data corresponding to multiple points in time, including data collected since a start of a voyage and instantaneous data provided closer to a time when the input is being provided to the state engine 206. In response to receiving an input at the state engine 206, the state engine 206 can generate a state 208 from the input and provide the state 208 to a policy engine 212.

The policy engine 212 can process the state 208 utilizing its current policy (e.g., based on current trained weights, of a machine learning model, that define the policy), and can generate one or more action parameters 138 based on processing of the state utilizing the current policy. The policy can be trained as described herein to cause action parameters 214 to be generated, such that the generated action parameters 214 maximize a reward (of the currently trained policy) in view of a given state 208. More specifically, in some implementations, the policy can seek to maximize a reward that seeks to (i) increase an accuracy for one or more estimated values of one or more operating variables (e.g., state of charge, state of energy, remaining flight time) associated with the vehicle 224 (at least relative to previous estimates and/or actual measured values for a respective operating variable), and/or (ii) reduce a probability that the vehicle 224 will run out of energy or charge during a voyage. Alternatively, or additionally, the policy engine 212 can generate action parameters 214 corresponding to one or more different actions to be performed by one or more devices and/or applications of the system 200.

In some implementations, the action parameters 214 generated by the policy engine 212 can correspond to one or more actions for modifying route data 222. For example, an output of the policy engine 212 can be associated with an estimated value for an operating variable, which can characterize a property of the vehicle 224 and/or a voyage of the vehicle 224. For example, the action parameters 214 can be associated with an estimate for state of charge of the battery 240, state of energy of the vehicle 224, remaining flight time (i.e., drive time) of the vehicle 224, and/or any other value that can be associated with an operation of the vehicle 224. In some implementations, in response to receiving the action parameters 214, the action engine 220 can communicate with the server device 210 in order to cause the route data 222 to change. For example, when the action parameters 214 indicate that a state of charge of a battery 240 of the vehicle 224 may not be enough for the vehicle 224 to complete the voyage without stopping at a charging station 242, the route data 222 can be modified to include the charging station 242 as a destination. Thereafter, the server device 210 can cause the vehicle 224 to maneuver to the charging station 242 to receive a charge, as illustrated in FIG. 2.

Alternatively, or additionally, in response to receiving the action parameters 214, the action engine 220 can communicate with the vehicle computing system 232 in order to cause one or more operations of one or more operational components 236 to occur. For instance, the action parameters 214 provided by the policy engine 212 can be associated with a state of energy or a state of charge estimate. The action engine 220 can use the action parameters 214 to generate a communication or signal that can be provided to the vehicle computing system 232, which can use the communication or signal to determine the estimated state of energy or estimated state of charge for the vehicle 224. The vehicle 224 can then be caused to modify one or more operating parameters of one or more operational components 236 in response to receiving the communication or signal from the action engine 220 and/or the server device 210. For example, an output of the prediction system 218 can be associated with a state of charge estimate that is more than enough for the vehicle 224 to reach a final location of a voyage. In response to receiving the aforementioned output, the vehicle computing system 232 can cause one or more of the operational components 236 to operate in a manner that causes the vehicle 224 to reach the final location ahead of a previously estimated time. Alternatively, another output of the prediction system 218 can be associated with a state of energy estimate that is equal to, or within a threshold tolerance, a value needed for the vehicle 224 to reach the final location of the voyage. In response to receiving the other output from the prediction system 218, the vehicle computing system 232 can cause one or more of the operational components 236 to operate in a manner that further preserves a charge of a battery 240 of the vehicle 224.

Alternatively, or additionally, in response to receiving the action parameters 214, the action engine 220 can communicate with a charging station computing device 226 of a charging station 242, in anticipation of the vehicle 224 reaching the charging station 242. For instance, the route data 222 provided to the state engine 206 can assist the action engine 220 in characterizing a charging station that the vehicle 224 may be approaching. In some implementations, operational data 234 received by the state engine 206 can assist the action engine 220 in providing a communication to the charging station 242 in order to influence a charging system 230 of the charging station 242. For example, an output of the action engine 220 can be associated with one or more characteristic values corresponding to a battery 240, or one or more other components of the vehicle 224. The output of the action engine 220 can cause the charging system 230 of the charging station computing device 226 to charge the battery 240 of the vehicle 224 in a more effective and/or safer manner. For example, a number of different characteristics can influence what makes a battery particularly safe or unsafe to operate and/or charge at a particular time. Such characteristics can include a battery temperature, an average current output of the battery over a period of time, a peak current, a peak voltage drop, an impedance, and/or any other characteristic that can influence battery operations. Therefore, in response to receiving a communication based on an output of the action engine 220, the charging station 242 can reconfigure in order to provide a charging scheme for the battery 240, rather than merely providing a charging scheme that is used indiscriminately for multiple vehicles. In this way, an operational lifetime of the battery can be extended, thereby reducing harmful waste that may occur from disposing of batteries, as well as promoting safety of passengers that may otherwise be harmed by unsafe battery charging practices.

Figure 3A:
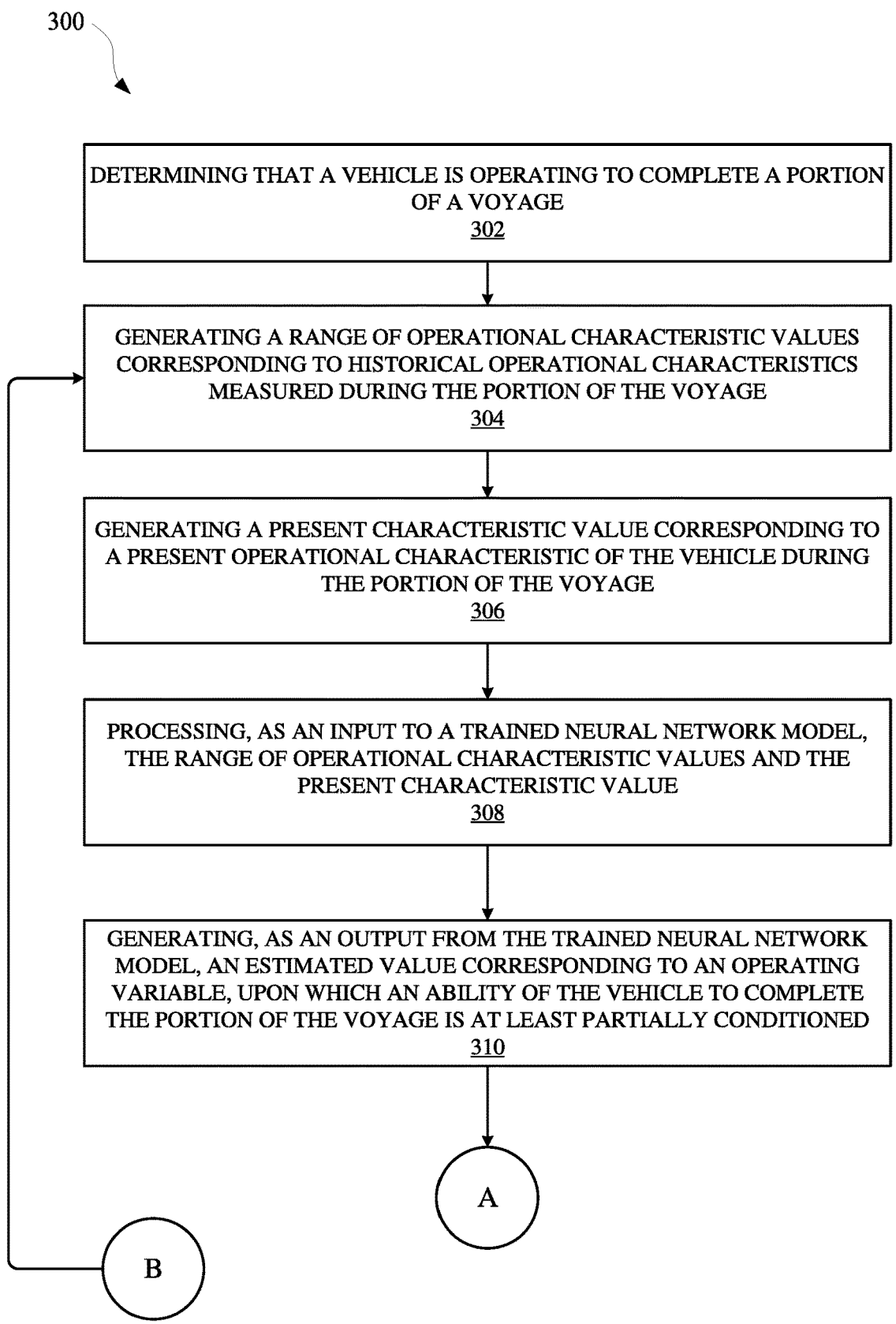
FIG. 3A and FIG. 3B illustrate methods for controlling a vehicle that is operating to complete a voyage using aggregate data, collected during the voyage, and a neural network model.
Figure 3B:
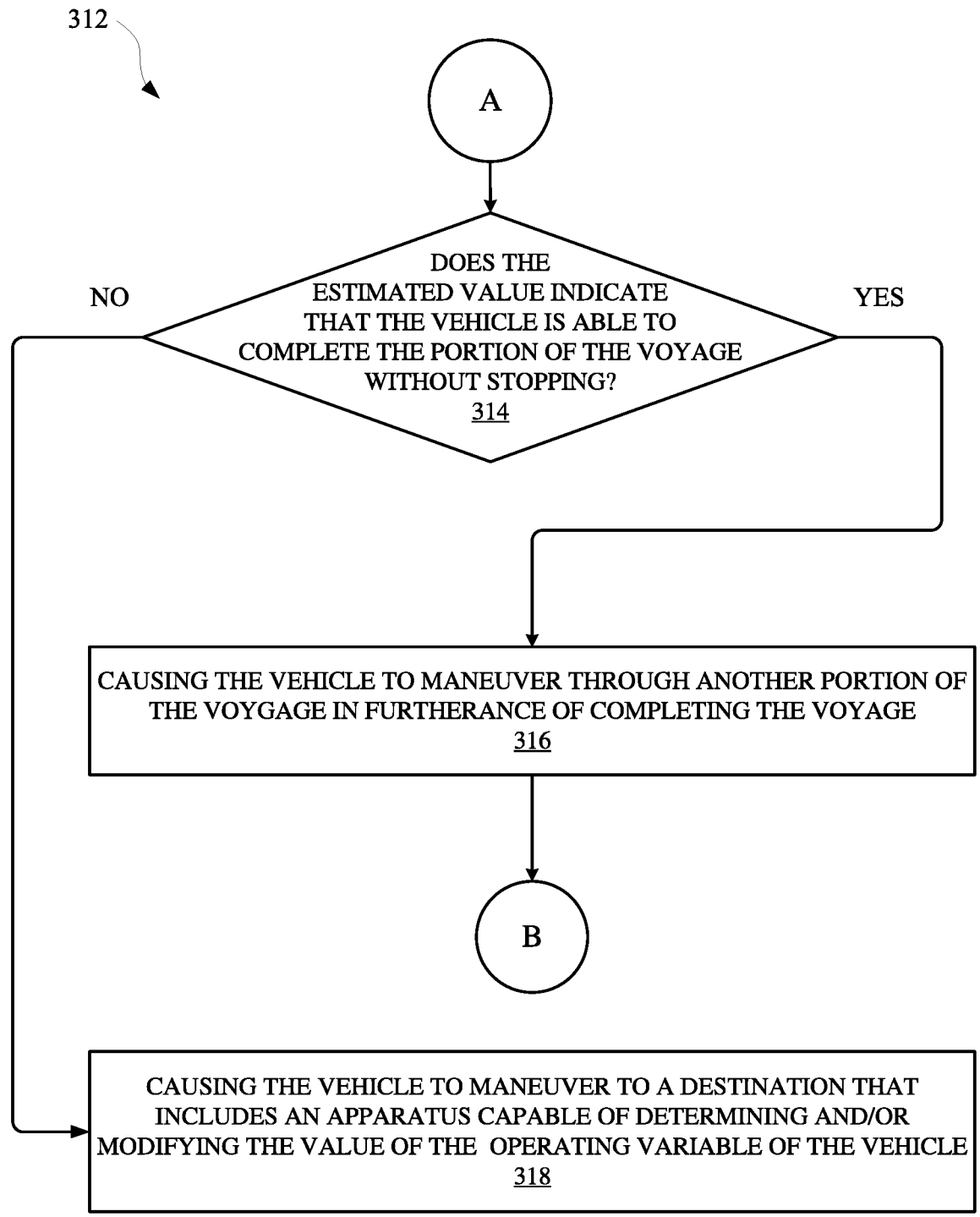

FIGS. 3A and 3B illustrate methods 300 and 312 for controlling a vehicle that is operating to complete a voyage using aggregate data, collected during the voyage, and a neural network model. The methods 300 and 312 can be performed by one or more computing devices, and/or applications, and/or any other apparatus or module capable of controlling or interacting with a vehicle. The method 300 can include an operation 302 of determining that a vehicle is operating to complete a portion of a voyage. The vehicle can be an autonomous or semi-autonomous vehicle such as an automobile, unmanned aerial vehicle (UAV), aircraft, and/or any other vehicle capable of traversing land, water, air, and/or space. The voyage can be characterized as, but is not limited to, a traversal of area between two different locations. For example, the voyage can be associated with a task assigned to the vehicle for delivering a payload from a first location to a second location. The payload can be, for example, medical supplies, a commercial or residential delivery, one or more persons, and/or any other object that can be delivered by vehicle. The vehicle can include one or more computing devices capable of controlling one or more driving mechanisms (e.g., a motor) of the vehicle, as well as one or more refuelable energy storage devices such as a battery, a capacitor, and/or a fuel tank. Furthermore, as the vehicle traverses various portions of the voyage, the vehicle can exhibit certain operational conditions (e.g., an average current, voltage drop, peak power, peak current, etc.), and can experience various environmental conditions (e.g., temperature, humidity, pressure changes, etc.).

The method 300 can further include an operation 304 of generating a range of operational characteristic values corresponding to historical operational characteristics measured during the portion of the voyage. The range of operational characteristic values can be multiple different measured values generated over a period of time. For example, during the portion of the voyage, a current output provided by a battery of the vehicle can be measured over a period of time in order to compile multiple values that can constitute the range of operational characteristic values. In some implementations, the measured values can correspond to operational characteristics, such as operational conditions of the vehicle and/or environmental conditions of the vehicle. Operational conditions can include properties of one or more components of the vehicle, and environmental conditions can include properties of one or more environmental elements experience by vehicle while maneuvering through the portion of the voyage. For example, a property of a component of the vehicle can include an operating temperature of a battery or motor of the vehicle. Alternatively, or additionally, a property of an environmental factor experienced by the vehicle can include an amount and/or direction of wind experience by the vehicle during the voyage.

The method 300 can also include an operation 306 of generating a present characteristic value corresponding to a present operational characteristic of the vehicle during the portion of the voyage. The present operational characteristic of the vehicle can characterize any feature or property of a vehicle, such as, but not limited to, a voltage drop of a battery, a current output of the battery, an amount of power being consumed by one or more components of the vehicle, a temperature of one or more components of vehicle, a statistical metric characterizing a condition or feature of the vehicle, a speed of the vehicle, an acceleration of the vehicle, an elevation of the vehicle, a distance traveled by the vehicle, a weight of the vehicle, and/or any other metric that can characterize a feature or property of the vehicle. The present characteristic value can be determined by one or more computing devices integral to the vehicle or located remotely from the vehicle. For instance, the vehicle can include one or more sensors or components capable of measuring certain operational characteristics of the vehicle. Alternatively, or additionally, the vehicle or a remote device performing the method 400, can be in communication with one or more sensors capable of being responsive to one or more characteristics exhibited by the vehicle.

The method 300 can further include an operation 308 of processing, as an input to a trained neural network model, the range of operational characteristic values and the present characteristic value. The trained neural network model can be stored in one or more memory devices located at the vehicle and/or at a device that is in communication with the vehicle. The trained neural network model can be trained using previous data from one or more voyages of one or more of the same or different vehicles. The input to the neural network model can correspond to a state from which an action can be determined, at least according to a policy of the neural network model. In some implementations, an action determined by the neural network model can be to provide an estimated value for an operating variable associated with the vehicle, and a policy of the neural network model can be to reward accurate estimates for the operating variable associated with the vehicle.

The method 300 can also include an operation 310 of processing the input of operation 308, using the trained neural network model, to generate output that indicates an estimated value for the operating variable, upon which an ability of the vehicle to complete the portion of the voyage is at least partially conditioned. The estimated value can be comprised of data from which an estimated value for the operating variable can be derived. In some implementations, the operating variable can be a state of charge and/or a state of energy of a battery of the vehicle, and the data can be used to generate an estimated state of charge value and/or state of energy value. A computing device can use the estimated value to make decisions regarding how to operate during the voyage. For instance, an estimated state of charge and/or state of energy of the battery can be used by the computing device to make a decision regarding whether to identify a location at which to charge the battery of the vehicle, or continue traveling in furtherance of completing the voyage.

The method 300 can proceed to method 312 as indicated by continuation element "A," of FIG. 3A and continuation element "A" provided at FIG. 3B. The method 312 can include an operation 314 of determining whether the estimated value indicates that the vehicle is able to complete the portion of the voyage without stopping. For instance, the vehicle may have to stop to receive some extrinsic service (e.g., refueling) at a particular location (e.g., a charging station). Therefore, by providing more accurate estimates of state of charge, according to some implementations, a risk of losing power during operations can be mitigated. This can result in the vehicle having a longer operational lifetime, thereby making a more efficient use of the resources necessary to construct and operate the robot.

When the estimated value indicates that the vehicle is able to complete the portion of the voyage without stopping, the method 312 can proceed to operation 316, which includes causing the vehicle to maneuver through another portion of the voyage in furtherance of completing the voyage. The other portion of the voyage can be different from the portion of the voyage introduced in a previous operation (e.g., operation 304). In some implementations, the other portion of the voyage can include at least part of the portion of the voyage introduced in a previous operation. As a result of maneuvering the vehicle through the other portion of the voyage, additional data can be collected and supplied as an input to the neural network model in order to subsequently generate another estimated value for the operating variable. In some implementations, the additional data can be aggregated with any previous data that has been a basis for an input to the neural network model. Therefore, a size of the data provided as an input to the neural network model can increase as the vehicle progresses through a particular voyage. The method 312 can thereafter proceed back to operation 304 according to continuation element "B," provided in FIG. 3B and FIG. 3A, with respect to the other portion of the voyage. Thereafter, some or all of the operations of method 300 and/or method 312 can be repeated with respect to the other portion of the voyage.

When the estimated value indicates that the vehicle is not able to complete the portion of the voyage without stopping to receive some extrinsic service, the method 312 can proceed to operation 318. Operation 318 can include causing the vehicle to maneuver to a destination that includes an apparatus capable of determining and/or modifying the value of the operating variable of the vehicle. For instance, the vehicle can be caused to maneuver to a charging station that is located between a starting location of the voyage and an ending location for the voyage. In some implementations, the charging station location can include an apparatus for charging a battery of the vehicle and to measure particular operational characteristics of the vehicle. For example, the apparatus can operate to intermittently charge the battery of the vehicle, and measure particular characteristics of the battery between charging periods. Alternatively, and/or additionally, the apparatus can operate to measure a weight of the vehicle, thereby allowing the apparatus to determine an operating variable of the vehicle. The determined and/or modified value for the operating variable can then be shared with one or more computing devices tasked with providing an input to the neural network model and/or controlling the vehicle. In this way, the operating variable can be employed to further train a neural network model associated with the vehicle, and/or providing another basis from which to make control decisions for the vehicle.

Figure 4:
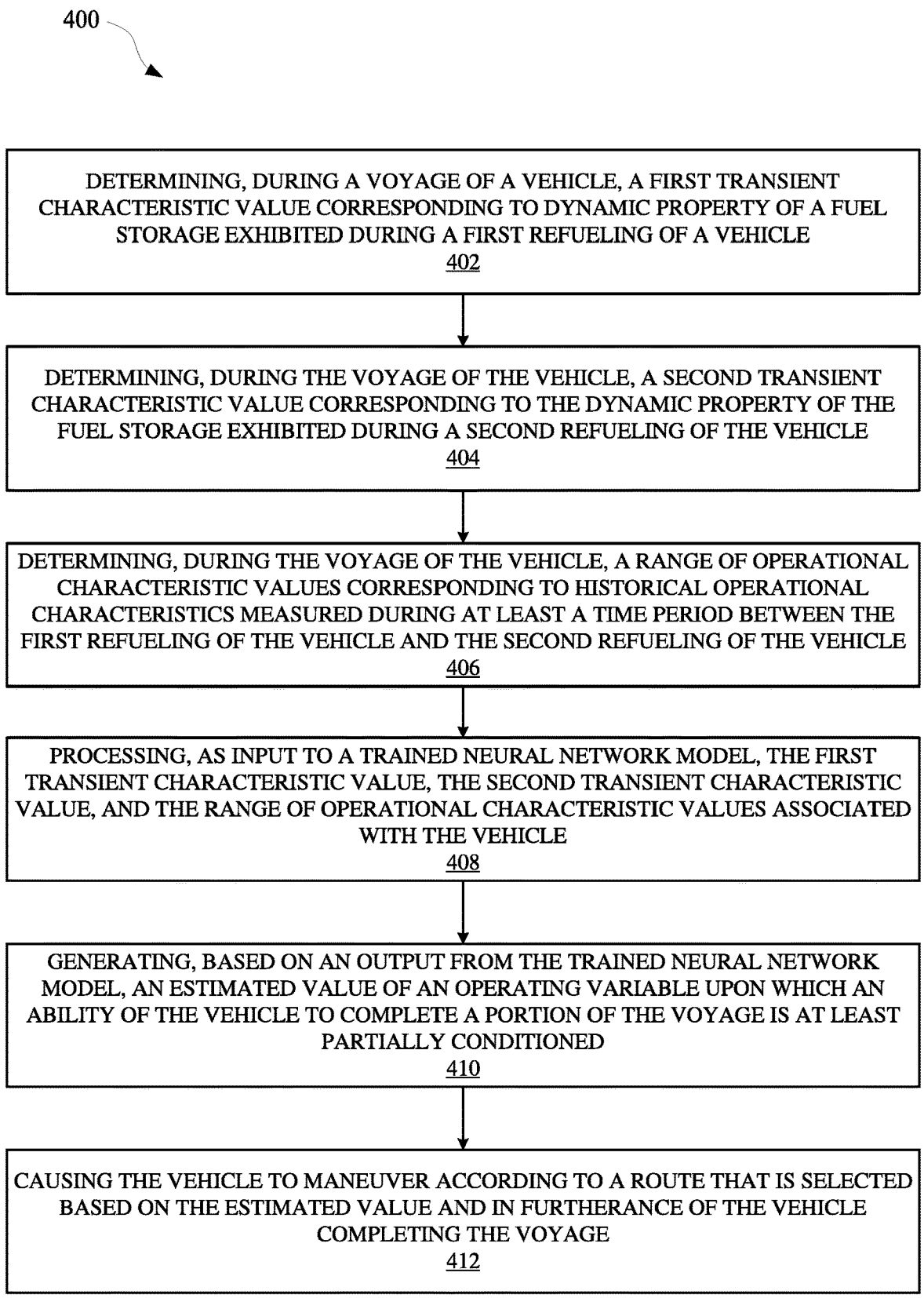
FIG. 4 illustrates a method for determining a route for a vehicle according to an output of a neural network model capable of receiving various inputs that correspond to measurements performed sequentially during a voyage of the vehicle.

FIG. 4 illustrates a method 400 for determining a route for a vehicle according to an output of a neural network model capable of receiving various inputs that correspond to measurements performed sequentially during a voyage of the vehicle. The method 400 can be performed by one or more computing devices, applications, and/or any other apparatus or module capable of processing vehicle-related data. The method 400 can include an operation 402 of determining, during a voyage of a vehicle, a first transient characteristic value, corresponding to a dynamic property of a fuel storage, exhibited during a first refueling of a vehicle. The fuel storage can be one or more batteries, capacitors, and/or any other fuel source capable of storing one or more types of fuel such as a solid, gas, and/or liquid. Furthermore, the vehicle can be a UAV, automobile, airplane, and/or any other type of vehicle capable of traversing land, water, air, and/or space. The first transient characteristic value can characterize a property of the fuel storage, such as a temperature, impedance, resistance, average current output over a period of time, power output, voltage output and/or voltage drop, and/or any other value that can characterize a fuel storage. The first transient characteristic value can be measured by a measurement system, which can be part of the vehicle, a charging station, a server device, and/or any other apparatus capable of generating measurement values. For instance, the charging station can include a measurement system capable of intermittently providing a signal (e.g., a sine wave, square wave, and/or any other waveform) to the fuel storage during refueling in order to determine a response from the fuel storage. The response can be used a basis from which to determine the first transient characteristic value.

The method 400 can further include an operation 404 of determining, during the voyage of the vehicle, a second transient characteristic value corresponding to the dynamic property of the fuel storage exhibited during a second refueling of the vehicle. For instance, while traveling in furtherance of completing the voyage from a first charging station, the vehicle can reach a second charging station that also includes a measurement system. The measurement system at the second charging station can similarly measure the second transient characteristic value, which may have changed since the vehicle traveled from the first charging station to the second charging station.

The method 400 can also include an operation 406 of determining, during the voyage of the vehicle, a range of operational characteristic values corresponding to historical operational characteristics. The historical operational characteristics can be measured during a time period that includes a time between the first refueling of the vehicle and the second refueling of the vehicle. For instance, the vehicle can be a UAV (e.g., a drone) that is capable of autonomously docking at the first charging station, taking flight, and subsequently docking at the second charging station. During the flight, a range of operational characteristics can be measured at the vehicle, and/or a remote device that is in communication with the vehicle. For instance, the range of operational characteristics can include multiple time-separated measurements of velocity, elevation, acceleration, pressure, temperature, current, impedance, power consumption, voltage drop, and/or any other statistical metric that can be derived from the aforementioned measurements (e.g., average current and/or peak power).

The method 400 can further include an operation 408 of processing, as input to a trained neural network model, the first transient characteristic value, the second transient characteristic value, and the range of operational characteristic values associated with the vehicle. In some implementations, when the vehicle is a UAV with one or more propellers, a range of characteristic values can include an amount of current provided to motors to spin the propellers, and/or an amount of voltage drop exhibited by the battery while driving the propellers. Alternatively, or additionally, the range of characteristic values can correspond to environmental data provided by one or more sources, and for characterizing one or more environmental conditions (e.g., wind speed, pressure, temperature, and/or any other environmental condition) experienced by the UAV during a time period of the voyage.

The method 400 can also include an operation 410 of generating, based on an output from the trained neural network model, an estimated value of an operating variable upon which an ability to complete a portion of the voyage is at least partially conditioned. For example, the operating variable can be an estimated voltage drop of a battery, which can vary according to various environmental conditions such as temperature, and can influence how much instantaneous power can be consumed by a component (e.g., a motor) that is connected to the battery. This can further provide an indication of whether the vehicle is able to complete a particular portion of the voyage, given that the vehicle is able to calculate an estimate of instantaneous power that may be required to complete the portion of the voyage. Alternatively, or additionally, the operating variable can be a voltage polarization of the battery and/or an impedance of the battery. Each estimate of the voltage polarization and/or the impedance of the battery can be used by the vehicle to determine whether to attempt to complete a portion of the voyage or modify a route in order to recharge at a charging station. Because the neural network model will be able to provide more accurate estimates of the operating variable during flight, the vehicle will be able to more intelligently use any available charge it currently has, thereby decreasing a probability that the vehicle will crash land, or become stranded, as a result of lack of charge.

Figure 5:
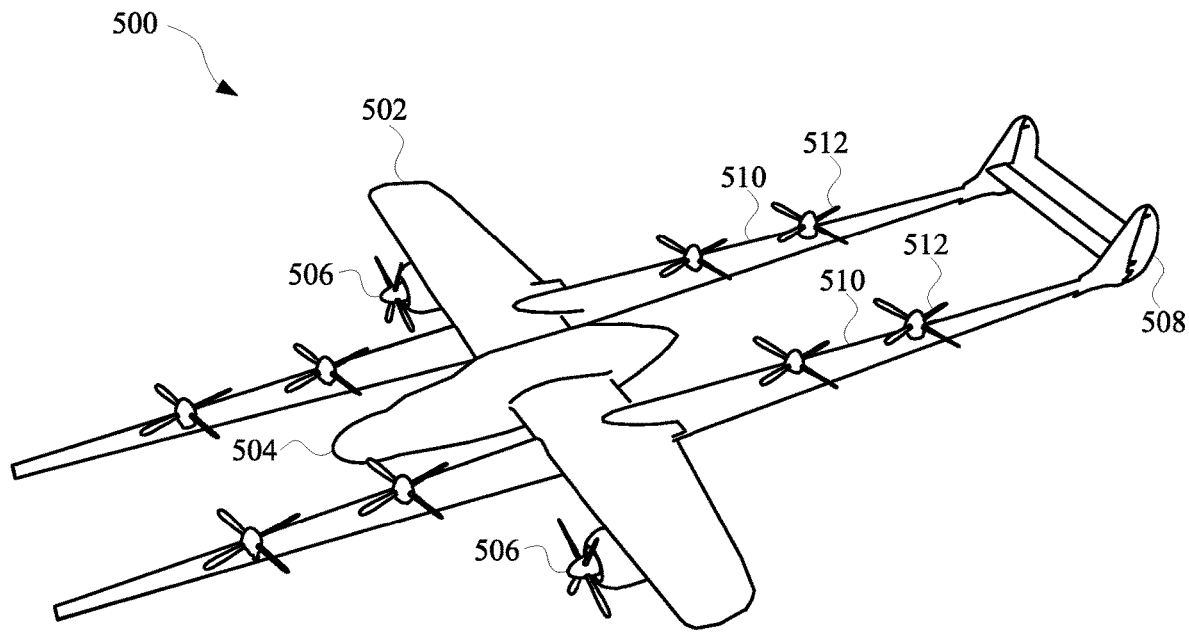
FIG. 5 illustrates a perspective view of a vehicle that can be incorporated into any of the implementations discussed herein.

FIG. 5 illustrates a perspective view 500 of a vehicle that can be incorporated into any of the implementations discussed herein. Specifically, FIG. 5 illustrates a fixed-wing UAV or unmanned aerial system (UAS), which may also be referred to as an airplane, an aeroplane, a biplane, a glider, or a plane, among other possibilities. The fixed-wing UAV, as the name implies, has stationary wings 502 that generate lift based on the wing shape and the vehicle's forward airspeed. For instance, the two wings 502 may have an airfoil-shaped cross section to produce an aerodynamic force on the UAV.

As depicted, the fixed-wing UAV may include a wing body 504 or fuselage. The wing body 504 may contain, for example, control electronics such as an inertial measurement unit (IMU) and/or an electronic speed controller, batteries, other sensors, and/or a payload, among other possibilities. The illustrative UAV may also include landing gear (not shown) to assist with controlled take-offs and landings. In other embodiments, other types of UAVs without landing gear are also possible.

The UAV can further include propulsion units 506 positioned on the wings 506 (or fuselage), which can each include a motor, shaft, and propeller, for propelling the UAV. Stabilizers 508 (or fins) may also be attached to the UAV to stabilize the UAV's yaw (turn left or right) during flight. In some embodiments, the UAV may be also be configured to function as a glider. To do so, UAV may power off its motor, propulsion units, etc., and glide for a period of time. In the UAV, a pair of rotor supports 510 extend beneath the wings 506, and a plurality of rotors 512 are attached rotor supports 510. Rotors 512 may be used during a hover mode wherein the UAV is descending to a delivery location, or ascending following a delivery. In the example UAV, stabilizers 508 are shown attached to the rotor supports 510.

During flight, the UAV may control the direction and/or speed of its movement by controlling its pitch, roll, yaw, and/or altitude. For example, the stabilizers 508 may include one or more rudders for controlling the UAV's yaw, and the wings 502 may include one or more elevators for controlling the UAV's pitch and/or one or more ailerons for controlling the UAV's roll. As another example, increasing or decreasing the speed of all the propellers simultaneously can result in the UAV increasing or decreasing its altitude, respectively.

Figure 6:
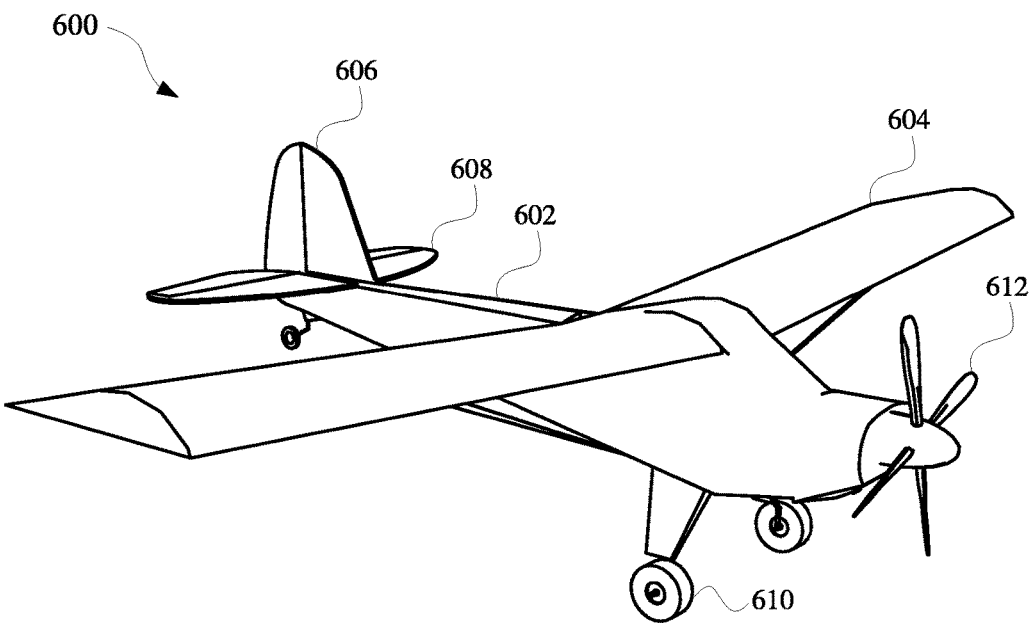
FIG. 6 provides a perspective view of a vehicle that can be incorporated into any of the implementations discussed herein.

Similarly, FIG. 6 provides a perspective view 600 of a vehicle that can be incorporated into any of the implementations discussed herein. Specifically, FIG. 6 shows another example of a fixed-wing UAV. The fixed-wing UAV can include a fuselage 602, two wings 604 with an airfoil-shaped cross section to provide lift for the UAV, a vertical stabilizer 606 (or fin) to stabilize the UAV's yaw (turn left or right), a horizontal stabilizer 608 (also referred to as an elevator or tailplane) to stabilize pitch (tilt up or down), landing gear 610, and a propulsion unit 612, which can include a motor, shaft, and propeller. In some implementations, the propulsion unit can be in a pusher configuration. The term "pusher" refers to the fact that a propulsion unit can be mounted at the back of the UAV and "pushes" the vehicle forward, in contrast to the propulsion unit being mounted at the front of the UAV. In other implementations, the UAV can be a tail-sitter UAV that has fixed wings to provide lift and allow the UAV 160 to glide horizontally, but also allows the UAV to take off and land vertically on its own.

Figure 7:
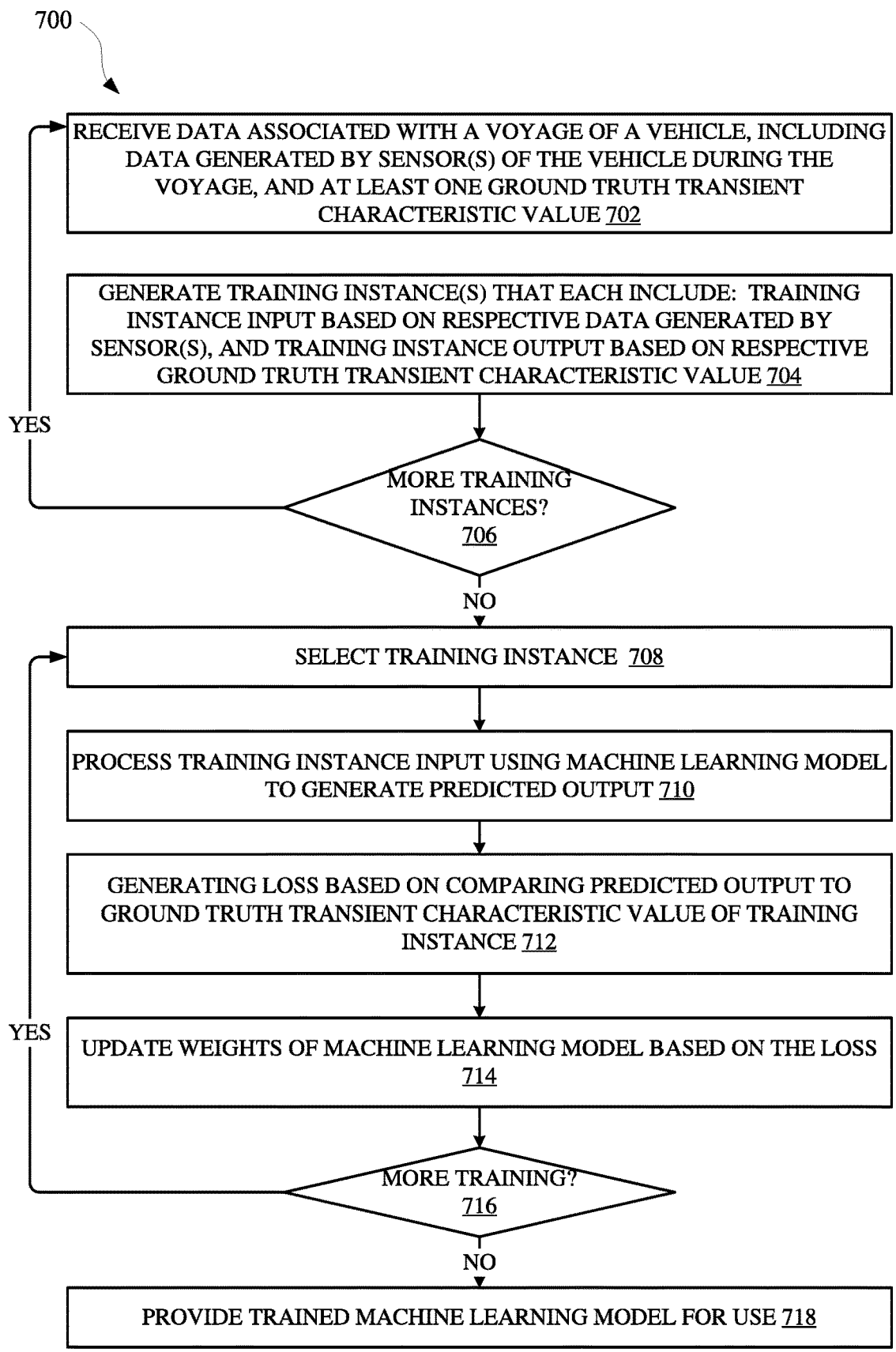
FIG. 7 illustrates a method for training a machine learning model that can be used in various implementations described herein.

FIG. 7 illustrates a method 700 of training a machine learning model that can be utilized in the performance of various methods described herein, such as method 300, method 400, and/or other methods described herein. For convenience, the operations of the flow chart of FIG. 7 are described with reference to a system that performs the operations. This system may include various components of various computer systems, such as one or more GPU(s), CPU(s), and/or TPU(s). Moreover, while operations of method 700 are shown in a particular order, this is not meant to be limiting. One or more operations may be reordered, omitted or added.

At block 702, the system receives data that is associated with a voyage of a vehicle. The data includes data generated by one or more sensors of the vehicle during the voyage, and includes at least one ground truth transient characteristic value (e.g., a state of charge value and/or other value). The data can also optionally include an identifier of a type of battery of the vehicle and/or an identifier that otherwise identifies one or more characteristics of the battery (e.g., number of cells, age, chemistry, etc.). The data can also optionally include an initial transient characteristic value for a battery at the beginning of the voyage (e.g., an initial state of charge and/or initial impedance).

At block 704, the system generates one or more training instances that each include: training instance input that is based on respective data generated by the sensor(s), and training instance output that is based on a respective ground truth transient characteristic value. The training instance input can also optionally include an identifier that identifies one or more characteristics of the battery and/or an initial transient characteristic value for the battery. It is noted that, in implementations where the training instance input includes an identifier that identifies one or more characteristics of the battery, training instances can be generated in method 700 that are based on various types of batteries having varying characteristics. Further, the machine learning model can be trained based on such training instances. This enables the machine learning model to be trained to enable prediction of an appropriate output given the characteristics of an indicated battery (as indicated by input data being processed), while enabling the machine learning model to be trained based on training data that is based on vehicles having a variety of batteries having a variety of characteristics. This can be beneficial in that a single model can be trained and utilized for various batteries having various characteristics. Further, this can be beneficial in that a machine learning model trained in such a manner can be more robust and/or more accurate as it can learn more generally applicable weights during training, and can further generalize to various types of batteries, including those not seen in training data.

As one example of blocks 702 and 704, assume the data at block 702 includes an initial transient characteristic value for a battery at the beginning of the voyage (e.g., an initial state of charge and/or initial impedance), multiple instances of sensor data during the voyage (e.g., an instance of sensor data for every 1 second of the voyage, or other frequency of sensor data), and a final ground truth transient characteristic value for the battery at the end of the voyage. The initial transient characteristic value for the battery can be based on output from a charging station that provides a signal to the battery in order to draw a measurable or suitable response from the battery, and uses the response to determine the initial transient characteristic. The final ground truth transient characteristic value for the battery at the end of the voyage can be based on output from the same and/or an additional charging station that provides the same or similar signal to the battery and uses the response to determine the ground truth transient characteristic. For example, that charging station can be the charging station that charges the vehicle upon completion of the voyage. In this manner, that charging station can provide output that can be utilized in generating a ground truth signal for the training instance.

If the machine learning model being trained is a recurrent neural network model, a single training example can be generated that includes, for example, training instance input that includes the series of sensor data and optionally the initial transient characteristic value, and training instance output that includes the ground truth transient characteristic value. In such a situation, the sensor data of the training instance input (and optionally the initial transient characteristic value) can be processed sequentially (e.g., a first instance in a first iteration, a second instance in a second iteration, etc.) using the model in block 710 (described below) to generate a final predicted output that is a predicted transient characteristic value. In other words, a predicted output can be generated at each iteration of processing a respective instance of the sensor data, and the final predicted output will be the predicted output at the final iteration. Further, the loss can be generated in block 712 (described below) based on comparing the predicted transient characteristic value to the ground truth transient value. Although such a loss will be a sparse loss, training of the machine learning model can converge with sufficient training data and/or with additional training data, such as that described below (e.g., training data based on data collected in a wind tunnel, that can supplement training data from real-world flights, such as described above).

If the machine learning model being trained is a feed forward neural network, a single training example can be generated that includes, for example, training instance input that includes an average, range, a median, and/or other single instance discretization of the series of sensor data and optionally the initial transient characteristic value. Further, the single training example can include training instance output that includes the ground truth transient characteristic value. In such a situation, the sensor data of the training instance input can be processed (and optionally the initial transient characteristic value) once using the model in block 710 (described below) to generate a predicted output that is a predicted transient characteristic value. Further, the loss can be generated in block 712 (described below) based on comparing the predicted transient characteristic value to the ground truth transient value.

As another example of blocks 702 and 704, assume the data at block 702 includes an initial transient characteristic value for a battery at the beginning of a simulated voyage in a wind tunnel (e.g., an initial state of charge and/or initial impedance), multiple instances of sensor data during the voyage in the wind tunnel (e.g., an instance of sensor data for every 1 second of the voyage, or other frequency of sensor data), and a respective ground truth transient characteristic value for the battery for each of the respective instances of sensor data. The respective ground truth transient characteristic value for each of the respective instances of sensor data can be based on, for example, a charging station and/or measurement tool that is tethered to the battery during the voyage in the wind tunnel.

If the machine learning model being trained is a recurrent neural network model, multiple training instances can be generated at block 704. Each of the training examples can include, as input, a sequence of a subset of the series of sensor data and optionally the initial transient characteristic value. Further, each of the training examples can include, as output, the ground truth transient characteristic value that corresponds to the last instance of sensor data in the subset. For example: a first training example can include input of instances 1-10 of sensor data, and output of the ground truth transient characteristic value measure following instance 10; a second training example can include input of instances 5-13 of sensor data, and output of the ground truth transient characteristic value measure following instance 13; a third training example can include input of instances 10-35 of sensor data, and output of the ground truth transient characteristic value measure following instance 35; etc.

If the machine learning model being trained is a feed forward neural network, multiple training instances can be generated at block 704. Each of the training examples can include, as input, an average, range, a median, and/or other single instance discretization of a subset of the series of sensor data series, instantaneous sensor data that follows the last sensor data of the series, and optionally the initial transient characteristic value. Further, each of the training examples can include, as output, a respective ground truth transient characteristic value that follows the instantaneous sensor data. For example: a first training example can include a range for instances 1-20 of sensor data, instantaneous sensor data that is based on instance 21 of sensor data, output of the ground truth transient characteristic value measure following instance 21; a second training example can include a range for instances 5-25 of sensor data, instantaneous sensor data that is based on instance 26 of sensor data, output of the ground truth transient characteristic value measure following instance 26; etc.

At block 706, the system determines whether to generate an additional training instance using additional data associated with an additional voyage of a vehicle (the same vehicle and/or another vehicle). If so, the system performs another iteration of blocks 702, 704, and 706. If not, the system proceeds to block 708. It is noted that although block 708 is illustrated as following block 706, in various implementations training instance generation and training of a machine learning model (in blocks 708-716) can occur in parallel.

At block 708, the system selects one of the training instances generated in an iteration of block 704.

At block 710, the system processes the training instance input, using a machine learning model, to generate predicted output that is a predicted transient characteristic value.

At block 712, the system generates a loss based on comparing the predicted output to the ground truth transient characteristic value of the training instance.

At block 714, the system updates weights of the machine learning model based on the generated loss.

At block 716, the system determines whether to perform more training of the machine learning model. If so, the system proceeds back to block 708, selects an additional training instance, then performs an iteration of blocks 710, 712, and 714 based on the additional training instance, then performs an additional iteration of block 716. In some implementations, the system can determine to perform more training if there are one or more additional unprocessed training instances and/or if other criterion/criteria are not yet satisfied. The other criterion/criteria can include, for example, whether a threshold number of epochs have occurred and/or a threshold duration of training has occurred. Although method 700 is described with respect to a non-batch learning technique, batch learning may additionally and/or alternatively be utilized.

If, at an iteration of block 716, the system determines not to perform more training, the system can proceed to block 718 where the system considers the machine learning model trained, and provides the machine learning model for use. For example, the system can provide the trained machine learning model to a UAV and/or other vehicle, for use by processor(s) of the vehicle in performance of one or methods described herein.

Figure 8:
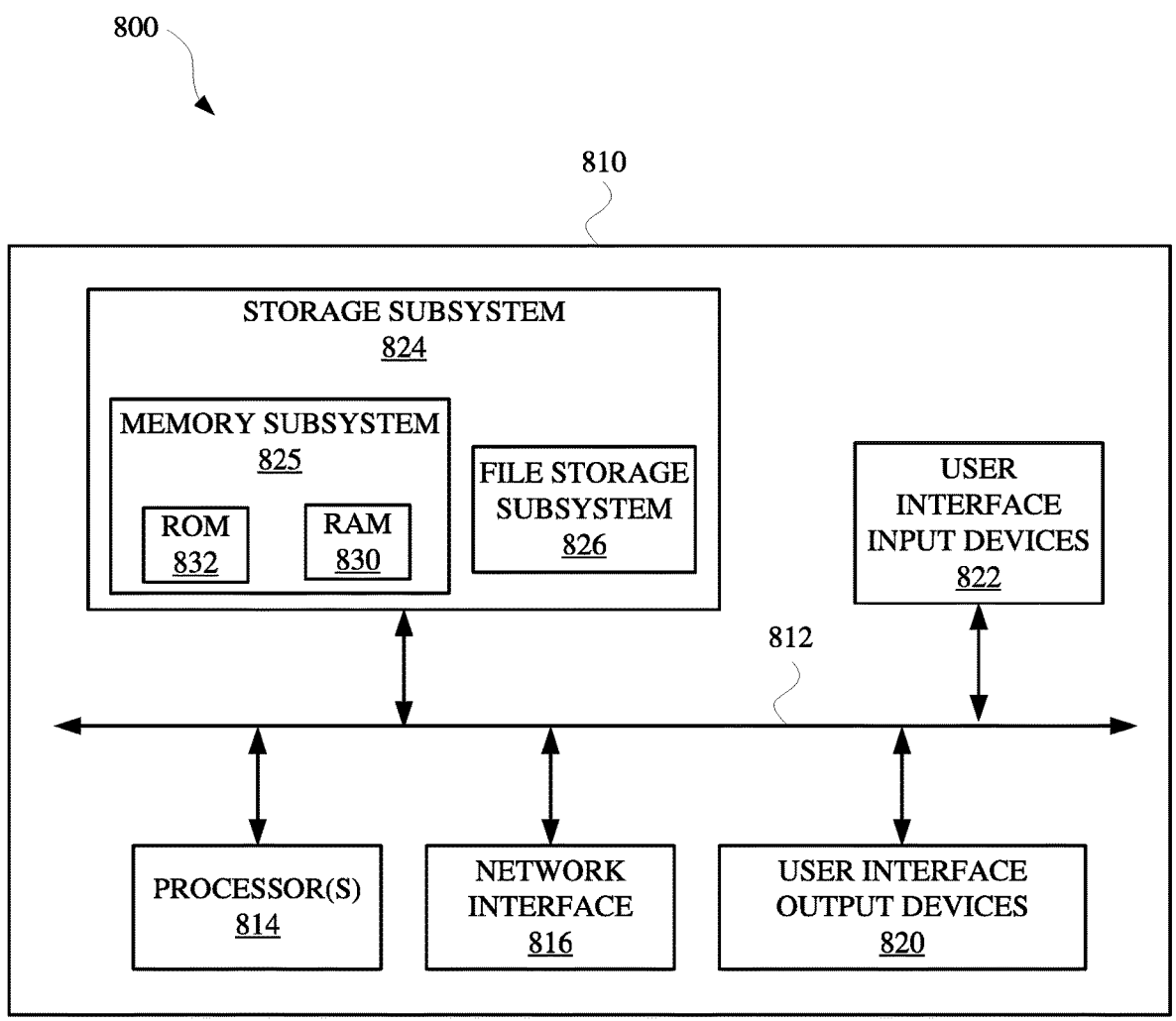
FIG. 8 is a block diagram of an example computer system.

FIG. 8 is a block diagram of an example computer system 810. Computer system 810 typically includes at least one processor 814 which communicates with a number of peripheral devices via bus subsystem 812. These peripheral devices may include a storage subsystem 824, including, for example, a memory 825 and a file storage subsystem 826, user interface output devices 820, user interface input devices 822, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 may include the logic to perform selected aspects of method 300, method 312, method 400, and/or to implement one or more of vehicle 104, first charging station 102, second charging station 122, third charging station 124, vehicle 224, server device 210, prediction system 218, state engine 206, policy engine 212, action engine 220, charging station computing device 226, vehicle computing system 232, and/or any other apparatus or module discussed herein.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

We claim:

1. A method implemented by one or more processors, the method comprising:
   receiving operational data corresponding to vehicle operations, which include a vehicle navigating to complete a voyage by at least passing between two different locations;
   receiving environmental data associated with environmental conditions in which the vehicle is operating while passing between the two different locations;
   processing the operational data and the environmental data using a neural network model that has been previously trained using past operational data and past environmental data collected during one or more voyages of one or more vehicles;
   generating, as output of the neural network model based on the processing, an estimated value corresponding to an operating variable of the vehicle, wherein the operating variable is associated with a state of charge of one or more batteries of the vehicle, and wherein the estimated value output by the neural network is indicative of whether the vehicle is able to complete the voyage without recharging the one or more batteries;

determining a voyage completion estimate based on the estimated value for the operating variable of the vehicle and a current status of the vehicle through the voyage; and when the voyage completion estimate indicates that the operating variable of the vehicle is insufficient for completing the voyage:
  causing the vehicle to maneuver to a separate location, between the two different locations.

2. The method of claim 1, wherein the vehicle is powered via one or more refuelable energy sources including the one or more batteries, and the operational data corresponds to one or more measured operating characteristics of the one or more refuelable energy sources.

3. The method of claim 2, wherein the neural network model is a recurrent neural network model that includes at least one memory layer, and wherein the operating variable is based on one or more of an estimated flight time, remaining flight time, battery energy, remaining battery energy, remaining distance, and/or remaining hover time.

4. The method of claim 3, wherein the vehicle is an unmanned aerial vehicle (UAV), an autonomous vehicle, non-autonomous vehicle, and/or a semi-autonomous vehicle; and causing the vehicle to maneuver to the separate location between the two different locations includes:
  determining that a charging station, at the separate location, exists near a current location of the vehicle, and
  determining that an estimated travel time between the current location and the separate location is less than or equal to the estimated remaining flight time.

5. The method of claim 2, wherein the neural network model is a feedforward neural network model.

6. The method of claim 1, wherein the vehicle includes one or more sensors and the operational data includes a statistical characteristic of at least a portion of sensor data from the one or more sensors.

7. The method of claim 6, wherein the statistical characteristic includes an average, a mode, a minimum, or a maximum of the portion of the sensor data.

8. A method implemented by one or more processors, the method comprising:
  determining a transient characteristic value corresponding to a dynamic property of an energy storage apparatus accessible to a vehicle, wherein the dynamic property is measured during a refueling of the vehicle, the refueling of the vehicle being immediately prior to, or along, a voyage of the vehicle;
  determining, during the voyage of the vehicle, a range of operational characteristic values associated with the vehicle, wherein the range of operational characteristic values correspond to historical operational characteristics measured during at least a time period during the voyage;
  processing, as input to a trained neural network model, the transient characteristic value and the range of operational characteristic values associated with the vehicle, wherein the input to the trained neural network model further includes an environmental characteristic value that is based on environmental data corresponding to an environmental condition affecting a battery of the vehicle during the voyage, and wherein the trained neural network model is trained based on data obtained during previous voyages of one or more vehicles;
  generating, as output from the trained neural network model and based on the processing, an estimated value corresponding to an operating variable of the vehicle, wherein the operating variable is associated with a state of charge of the energy storage apparatus, and wherein the estimated value output by the neural network is indicative of whether the vehicle is able to complete the voyage without refueling the energy storage apparatus; and
  causing the vehicle to maneuver according to a trajectory that is selected based on the estimated value and in furtherance of the vehicle completing the voyage.

9. The method of claim 8, wherein the energy storage apparatus includes one or more batteries including the battery, and wherein the method further comprises:
  receiving the environmental data from a remote computing device that is connected to an environmental sensor.

10. The method of claim 8, wherein the historical operational characteristics are measured by one or more sensors of the vehicle during the voyage of the vehicle.

11. The method of claim 8, wherein the refueling of the vehicle is performed at a location that includes a charging station configured to measure the dynamic property or along the voyage via a charging apparatus configured to measure the dynamic property.

12. The method of claim 11, wherein the dynamic property includes an impedance value of the energy storage apparatus of the vehicle, and each charging station is configured to intermittently charge the energy storage apparatus and measure the impedance value of the energy storage apparatus during a respective refueling.

13. A method implemented by one or more processors, the method comprising:
  generating a first range of operational characteristic values associated with a vehicle that is operating to complete a voyage, wherein the first range of operational characteristic values correspond to historical operational characteristics measured during a first portion of the voyage of the vehicle;
  generating a first present characteristic value corresponding to a first present operational characteristic of the vehicle, wherein the historical operational characteristics and the first present operational characteristic convey different operating characteristics of the vehicle;
  processing, as a first input to a trained neural network model, the first range of operational characteristic values and the first present characteristic value;
  generating, as a first output from the trained neural network model and based on the processing, a first estimated value corresponding to an operating variable of the vehicle, wherein the first estimated value is indicative of whether the vehicle is able to complete a portion of the voyage without recharging one or more power supplies configured to provide power to the vehicle or one or more batteries included in the vehicle, wherein the operating variable includes a state of charge of the one or more power supplies or the one or more batteries, and wherein the first range of operational characteristic values is generated based on environmental measurements performed by the vehicle during the first portion of the voyage;
  determining a second range of operational characteristic values corresponding to other historical operational characteristics measured during a second portion of the voyage of the vehicle that is sequentially later in the voyage relative to the first portion of the voyage;
  determining a second present characteristic value corresponding to a second present operational characteristic of the vehicle, wherein the second present operational characteristic of the vehicle is exhibited subsequent to the vehicle exhibiting the first present operational characteristic;

providing, as a second input to the trained neural network model, the second range of operational characteristic values and the second present characteristic value, wherein the trained neural network model is a recurrent neural network model that stores the first output for processing with the second input to determine a second output;

receiving the second output from the trained neural network model, wherein the second output includes a second estimated value corresponding to the operating variable of the vehicle; and causing the vehicle to maneuver in furtherance of completing the voyage based on the second estimated value corresponding to the operating variable of the vehicle.

14. The method of claim 13, wherein the operating variable indicates an amount of energy storage available at the vehicle.

15. The method of claim 14, wherein causing the vehicle to maneuver in furtherance of completing the voyage based on the second estimated value includes:

when the amount of energy storage available at the vehicle is indicated to be sufficient for completing the voyage without refueling:

causing the vehicle to maneuver to a destination that is designated as a final destination of the vehicle for the voyage.

16. The method of claim 14, wherein causing the vehicle to maneuver in furtherance of completing the voyage based on the second estimated value includes:

when the amount of energy storage available at the vehicle is indicated as being insufficient for completing the voyage without refueling:

causing the vehicle to maneuver to a refueling location for refueling the vehicle prior to arriving at a final destination of the vehicle for the voyage.

17. The method of claim 14, wherein the amount of energy storage corresponds to the one or more batteries of the vehicle that are a type of battery the vehicle, and wherein the trained neural network model is trained using data from one or more vehicles that include the type of battery.

18. The method of claim 13, wherein the different operating characteristics of the vehicle include one or more electrical characteristics selected from a list that includes: a present voltage drop, a present current output, an average current output for the journey, or a maximum current output exhibited during the voyage; and wherein the operating variable corresponds to one or more status characteristics selected from another list that includes: a state of charge or a state of energy.

19. The method of claim 13, wherein a time period corresponding to the second range of values at least partially overlaps with another time period corresponding to the first range of values.

* * * * *